(12) United States Patent
Shin et al.

(10) Patent No.: US 10,432,731 B2
(45) Date of Patent: Oct. 1, 2019

(54) ELECTRONIC DEVICE AND METHOD OF CONTROLLING SENSORS CONNECTED THROUGH NETWORK

(71) Applicants: SAMSUNG ELECTRONICS CO., LTD., Suwon-si, Gyeonggi-do (KR); RESEARCH & BUSINESS FOUNDATION, SUNGKYUNKWAN UNIVERSITY, Suwon-si, Gyeonggi-do (KR)

(72) Inventors: Dong-kun Shin, Seoul (KR); Eun-soo Park, Yongin-si (KR); Si-hoon Choi, Seoul (KR); Gyeong-hwan Hong, Suwon-si (KR)

(73) Assignees: Samsung Electronics Co., Ltd., Suwon-si, Gyeonggi-do (KR); Research & Business Foundation, Sungkyunkwan University, Suwon-si, Gyeonggi-do (KR)

( * ) Notice: Subject to any disclaimer, the term of this patent is extended or adjusted under 35 U.S.C. 154(b) by 223 days.

(21) Appl. No.: 15/401,295

(22) Filed: Jan. 9, 2017

(65) Prior Publication Data
US 2017/0214745 A1 Jul. 27, 2017

(30) Foreign Application Priority Data
Jan. 21, 2016 (KR) .................. 10-2016-0007679

(51) Int. Cl.
G06F 15/16 (2006.01)
H04L 29/08 (2006.01)
H04L 12/28 (2006.01)
H04L 12/26 (2006.01)

(52) U.S. Cl.
CPC ........ *H04L 67/125* (2013.01); *H04L 12/2823* (2013.01); *H04L 43/10* (2013.01)

(58) Field of Classification Search
CPC .... H04L 67/125; H04L 12/2823; H04L 43/10
USPC .......................................................... 709/217
See application file for complete search history.

(56) References Cited

U.S. PATENT DOCUMENTS

| | | | | |
|---|---|---|---|---|
| 2012/0047551 A1* | 2/2012 | Pattar | ..................... | H04W 4/00 726/1 |
| 2013/0086245 A1* | 4/2013 | Lu | ....................... | H04L 12/2807 709/223 |
| 2014/0184422 A1* | 7/2014 | Mensinger | .......... | A61B 5/0004 340/870.02 |

(Continued)

FOREIGN PATENT DOCUMENTS

KR 10-2014-0074357 6/2014

*Primary Examiner* — Sm A Rahman
(74) *Attorney, Agent, or Firm* — Nixon & Vanderhye P.C.

(57) ABSTRACT

Disclosed is an electronic device configured to connect with at least one sensor device through a network. The electronic device includes a communicator comprising communication circuitry configured to communicate with the at least one sensor device and a user terminal, a storage configured to store information of data acquiring methods available for the sensor device and information of settings of a current data acquiring method and a processor configured to determine whether data is acquirable based on the stored information of the data acquiring methods in response to a request for acquiring the data from the user terminal with respect to the at least one sensor device, and to control the at least one sensor based on the determination.

18 Claims, 17 Drawing Sheets

(56) References Cited

U.S. PATENT DOCUMENTS

2015/0373482 A1\* 12/2015 Barnard ............ H05B 37/0272
370/338

\* cited by examiner

FIG. 8

SENSOR DIRECTORY

| | | | | STORAGE OF LIST OF DATA ACQUIRING METHODS AVAILABLE FOR SENSOR DEVICES | STORAGE OF CURRENT DATA ACQUIRING METHOD DESIGNATED BY TERMINAL DEVICE |
|---|---|---|---|---|---|
| URI | SENSOR VALUE | SENSING DATA ATTRIBUTES | USER LIST | AVAILABLE DATA ACQUIRING METHODS | CURRENT DATA ACQUIRING METHODS |
| /FIRST SENSOR DEVICE /FIRST PHYSICAL SENSOR | "false" | FLAME DETECTION | FIRST USER TERMINAL, FIRST VIRTUAL SENSOR | Bus: P-- / Net: PBM | Bus: P 20 / Net: M 10 |
| /SECOND SENSOR DEVICE /SECOND PHYSICAL SENSOR | 420 | GAS CONCENTRATION | FIRST USER TERMINAL, SECOND VIRTUAL SENSOR | Bus: P-- / Net: P-- | Bus: P 100 / Net: P 150 |
| /THIRD SENSOR DEVICE /THIRD PHYSICAL SENSOR | 30, 80 | TEMPERATURE, HUMIDITY | FIRST USER TERMINAL, SECOND VIRTUAL SENSOR | Bus: P-M / Net: PBM | Bus: M 100 / Net: P 50 |
| /THIRD SENSOR DEVICE /FOURTH PHYSICAL SENSOR | 771 | ATMOSPHERIC PRESSURE | SECOND VIRTUAL SENSOR | Bus: P-M / Net: PBM | Bus: M 100 / Net: M 12M |
| /THIRD SENSOR DEVICE /FIFTH PHYSICAL SENSOR | 92 | HEART RATE | SECOND VIRTUAL SENSOR | Bus: PBM / Net: PBM | Bus: B 200 / Net: B 150 |

ELECTRONIC DEVICE AND METHOD OF CONTROLLING SENSORS CONNECTED THROUGH NETWORK

CROSS-REFERENCE TO RELATED APPLICATION

This application is based on and claims priority under 35 U.S.C. § 119 to Korean Patent Application No. 10-2016-0007679, filed on Jan. 21, 2016 in the Korean Intellectual Property Office, the disclosure of which is incorporated by reference herein in its entirety.

BACKGROUND

Field

The present disclosure relates generally to an electronic device and a method of controlling a plurality of sensors connected through a network, and for example, to an electronic device and a method of efficiently controlling a plurality of sensors and reducing power consumption.

Description of Related Art

A virtual sensor allows sensor devices to be widely used on a network. To introduce the virtual sensor, there is a need of a server for collecting and processing physical sensing data. For example, there have been proposed a method of using a smartphone or the like user terminal as a virtual sensor server, a method of using an access point or the like gateway, a method of using a cloud server, etc. As compared with a mobile terminal device, the gateway sufficiently receives alternating current (AC) power or the like power, and gives high performance even though it additionally needs a networking operation between an application program and the virtual sensor. Further, the gateway has a shorter communication path and a shorter communication delay than those of the cloud server. These methods have something in common that they use a representational state transfer (REST) interface so that the virtual sensor can directly access all the sensor devices on the network through a uniform resource identifier (URI).

Power efficiencies of the sensor device and the user terminal are varied depending on methods of acquiring data from the sensor device. Technology about a method of acquiring sensing data has been proposed even before the appearance of an Internet of Things environment using the virtual sensor. The method of acquiring the sensing data according to the characteristics of the sensor device is broadly classified into polling and a push. The polling is a method that a user periodically reads data from the sensor, and the push is a method that the sensor sends data to a user when a specific event occurs in the sensor. Further, a push-based optimum method includes a model-driven method and a batching method. If the sensing data is not frequently processed, the batching method is advantageous since the sensing data is collected and then sent. If a slight change in the sensing data is ignorable, the model-driven method is advantageous since the sensing data is sent only when the sensing data is largely changed. However, if the sensor device does not support the batching method or the model-driven method in light of hardware, there may be no choice but to use the polling.

Further, the frequency of acquiring data is differently affected according to the methods of acquiring the sensing data. For example, the frequency of acquiring sensing data is determined based on a cycle of acquiring the sensing data in case of the polling, the number of pieces of sensing data to be sent at the same time in case of the batching method, or a threshold value for sending the sensing data in case of the model-driven method.

In particular, the Internet of Things environment involves more various kinds of sensor devices than the existing mobile environment, and thus different methods of acquiring the sensing data are used in accordance with the kinds of sensor to thereby increase power efficiencies. However, the method of acquiring the sensing data in the conventional virtual sensor technology does not increase the power efficiencies since it is limited to the REST interface, e.g., the operations of GET (polling) and OBSERVE (push).

In addition, there is a method of acquiring the sensing data even in Internet of Things environments where the virtual sensor is not used. However, this method merely controls a polling cycle, a network transfer cycle and the like frequency settings for acquiring the sensing data, or selects one among the methods of acquiring the sensing data, i.e. the polling, push and model-driven methods. However, such a change in only the method or frequency of acquiring the sensing data fails to meet a variety of Internet of Things sensor devices and a demand of the virtual sensor.

SUMMARY

Accordingly, an example aspect of the present disclosure provides an electronic device and a method of controlling sensors connected through a network, in which a sensor-data acquiring method suitable for the kind of sensor device is used in an Internet of Things environment where a virtual sensor accesses various kinds of sensor devices, thereby maximizing and/or improving the power efficiency.

According to an example aspect of the present disclosure, an electronic device connecting with at least one sensor device through a network is provided, the electronic device including a communicator comprising communication circuitry configured to communicate with the at least one sensor device and a user terminal; a storage configured to store information about data acquiring methods available for the sensor device and information about settings of a current data acquiring method; and a processor configured to determine whether data is acquirable based on the stored information about the data acquiring methods in response to a request for acquiring the data from the user terminal with respect to the at least one sensor device, and to control the at least one sensor based on determination results.

In the present disclosure, the information about the data acquiring method may include information on at least one of a polling method, a batching method and a model-driven method.

In the present disclosure, the setting of the current data acquiring method may include the setting of a data acquiring frequency associating with at least one of the polling method, the batching method and the model-driven method.

In the present disclosure, the data acquiring frequency may be virtualized into numerals regardless of the kind of data acquiring methods.

In the present disclosure, the processor may send the user terminal a result of determining whether the data is acquirable.

In the present disclosure, the processor may update the information about the settings of the current data acquiring method in response to a data acquiring request of the user terminal if data is acquirable.

In the present disclosure, the processor may transmit the information about the settings of the current data acquiring method to the at least one sensor device if data is acquirable.

In the present disclosure, the information about the available data acquiring methods may be received from the at least one sensor device when connecting with the at least one sensor device.

In the present disclosure, the electronic device may further include at least one virtual sensor configured to acquire and process sensing data from the at least one sensor device.

In the present disclosure, the virtual sensor may transmit the processed sensing data to the user terminal.

In the present disclosure, the processor may determine data acquiring settings in accordance with priorities if two or more data acquiring settings of the virtual sensor and the user terminal conflict with each other with respect to one physical sensor.

In the present disclosure, the storage may store information about a method where the sensor devices acquire data from an internal sensor module through a bus and information about a method where the sensor devices acquire data through the network.

According to another example aspect of the present disclosure, a method of controlling at least one sensor device connected through a network is provided, the method including storing information about data acquiring methods available for the at least one sensor device and information about settings of a current data acquiring method, receiving, from a user terminal, a request for acquiring data with respect to the at least one sensor device and determining whether the data is acquirable based on the stored information about the data acquiring methods in response to the request for acquiring the data, and controlling the at least one sensor based on results of the determining.

In the present disclosure, the information about the data acquiring method may include information on at least one of a polling method, a batching method and a model-driven method.

In the present disclosure, the setting of the current data acquiring method include the setting of a data acquiring frequency associating with the polling method, the batching method and the model-driven method.

In the present disclosure, the data acquiring frequency may be virtualized into numerals regardless of the kind of data acquiring methods.

In the present disclosure, the method may further include sending the user terminal a result of determining whether the data is acquirable.

In the present disclosure, the method may further include updating the information about the settings of the current data acquiring method if the requested data is acquirable.

In the present disclosure, the information about the data acquiring methods may be received from the at least one sensor device when connecting with the at least one sensor device.

According to another example aspect of the present disclosure, a non-volatile recording medium with a program for implementing the aforementioned method is provided.

BRIEF DESCRIPTION OF THE DRAWINGS

The above and/or other aspects, features and attendant advantages of the present disclosure will become apparent and more readily appreciated from the following detailed description, taken in conjunction with the accompanying drawings, in which like reference numerals refer to like elements, and wherein:

FIG. 8 is a diagram illustrating an example sensor directory according to an example embodiment;

DETAILED DESCRIPTION

Figure 1:
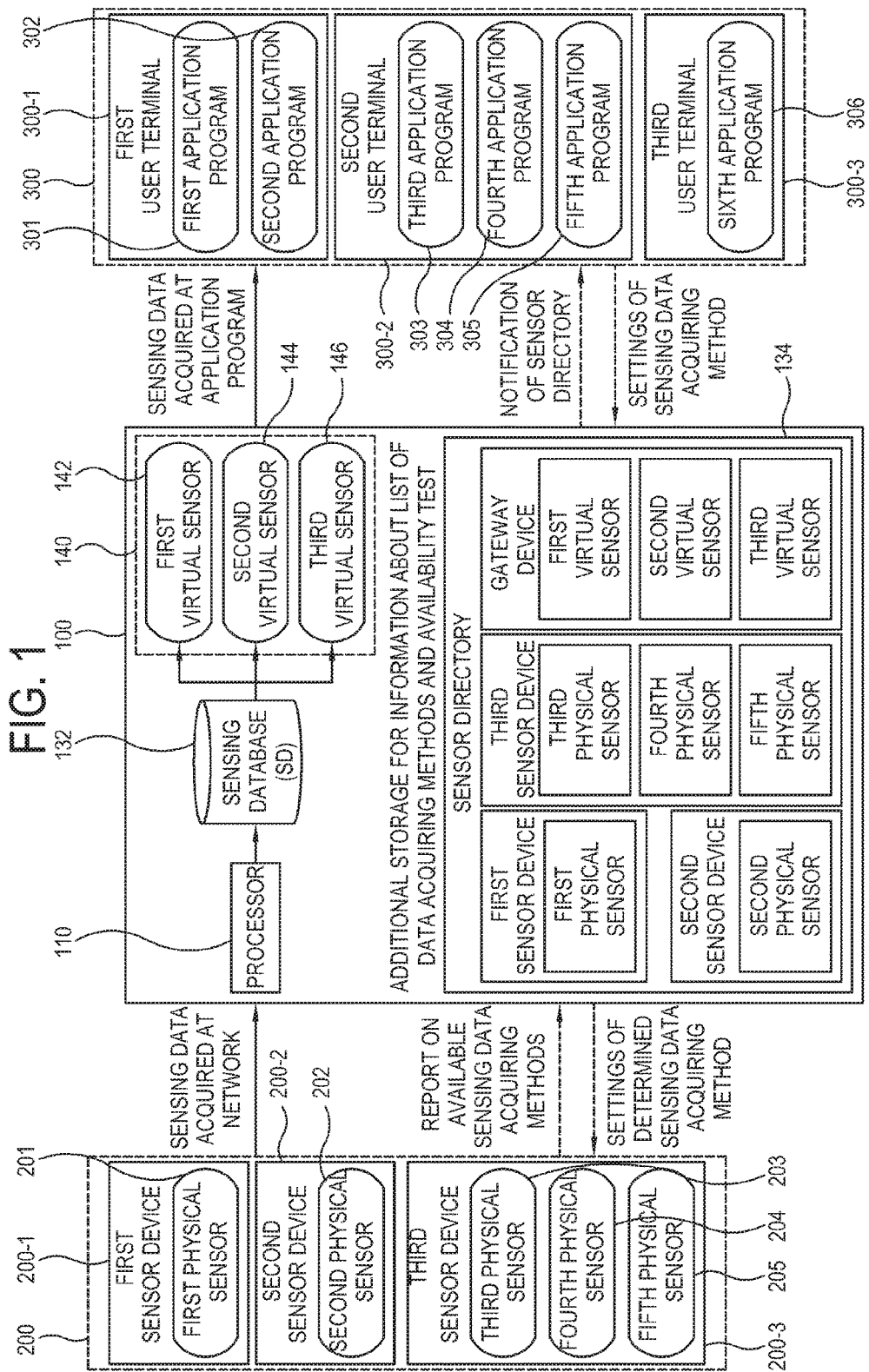
FIG. 1 is a diagram illustrating an example process of acquiring sensing data according to an example embodiment.

Below, various example embodiments will be described with reference to accompanying drawings. The following example embodiments are illustrative only, and it should be understood that all suitable modification, equivalents and/or alternatives fall within the scope of the disclosure. Throughout the drawings, like numerals refer to like elements.

In this description, "have," "may have," "include," "may include" or the like expression refer to presence of the corresponding features (e.g., numerical values, functions, operations, or elements of parts, and does not exclude additional features.

In this description, "A or B," "at least one of A or/and B," "one or more of A or/and B" or the like expression may involve any possible combination of listed elements. For example, "A or B," "at least one of A and B," or "at least one A or B" may refer all of (1) at least one A, (2) at least one B, or (3) both at least one A and at least one B.

In this description, "a first," "a second," "the first," "the second" or the like expression may modify various elements regardless of order and/or importance, and does not limit the elements. These expressions may be used to distinguish one element from another element. For example, a first user device and a second user device may refer to different user devices regardless of order and importance. For instance, a first element may be named a second element, and vice versa without departing the scope of the present disclosure.

If a certain element (e.g. a first element) is "operatively or communicatively coupled with/to" or "connected to" another element (e.g. a second element), it will be understood that the certain element is connected to another element directly or via an additional element (e.g. a third element). On the other hand, if a certain element (e.g. the first element) is "directly coupled with/to" or "directly connected to" another element (e.g. the second element), it will be understood that there are no additional element (e.g. the third element) between the certain element and another element.

In this description, the expression of "configured to" may be for example used interchangeably by "suitable for," "having the capacity to," "designed to," "adapted to," "made to," or "capable of" in accordance with circumstances. The expression of "configured to" may not necessarily refer to only "specifically designed to" in terms of hardware. Instead, the "device configured to" may refer to "capable of"

together with other devices or parts in a certain circumstance. For example, the phrase of "the processor configured to perform A, B, and C" may refer, for example, to a dedicated processor (e.g. an embedded processor) for performing the corresponding operations, or a generic-purpose processor (e.g. a central processing unit (CPU) or an application processor) for performing the corresponding operations by executing one or more software programs stored in a memory device.

In this description, terms may be used for explaining a certain embodiment and not intended to limit the scope of other embodiments. A singular expression may involve a plural expression as long as it does not clearly give different meaning contextually. All the terms set forth herein, including technical or scientific terms, have the same meanings as those generally understood by a person having an ordinary skill in the art. Terms defined in a general-purpose dictionary may be construed to have the same or similar meanings as the contextual meanings of the related art, and should not be interpreted as ideally or excessively formal meanings. As necessary, the terms defined in this description should not be construed to exclude the embodiments of the present disclosure.

FIG. 1 is a diagram illustrating an example process of acquiring sensing data according to an example embodiment. A plurality of sensor devices, e.g. a first sensor device 200-1, a second sensor device 200-2 and a sensor device 200-3 are connected to a network, e.g. Internet of Things through a gateway device 100. A plurality of user terminals, e.g. a first user terminal 300-1, a second user terminal 300-2 and a third user terminal 300-3 acquire sensing data from the plurality of sensor devices 200-1, 200-2 and 200-3 through the gateway device 100.

The gateway device 100 may refer, for example, a functional unit or device that connects two or more different or same kinds of communication networks and allows information to be exchanged between the communication networks. The communication network includes a local area network (LAN), public data network (PDN), public switched telephone network (PSTN), etc. Further, the gateway device 100 is a functional unit or device that converts protocols by connecting a plurality of communication networks different in protocol and thus not compatible in respective layers of the open systems interconnections (OSI) reference model. The gateway device 100 may be for example achieved by a router (i.e. an access point), a hub, a relay, etc.

Referring to FIG. 1, the gateway device 100 includes a processor (e.g., including processing circuitry) 110 which processes various pieces of data and generally controls elements or the like; a sensing database (SD) 132 which stores raw data acquired from a plurality of sensor devices 200-1, 200-2 and 200-3 connected through the network; at least one virtual sensor 142, 144 and 146 which manages and controls the plurality of sensor devices 200-1, 200-2 and 200-3 connected through the network; and a sensor directory 134 which records attribute information, setting information, etc. of the plurality of sensor devices 200-1, 200-2 and 200-3 and the at least one virtual sensors 142, 144, 146.

The sensor directory 134 includes sensor values, sensing data attributes, a user list, available data-acquiring methods and information about a currently set data-acquiring method of first to fifth physical sensors 201~205 of the sensor devices 200-1, 200-2 and 200-3 connected through the network. The available data-acquiring methods are classified into a polling method (P), a batching method (B) and a model-driven method (M).

Figure 2:
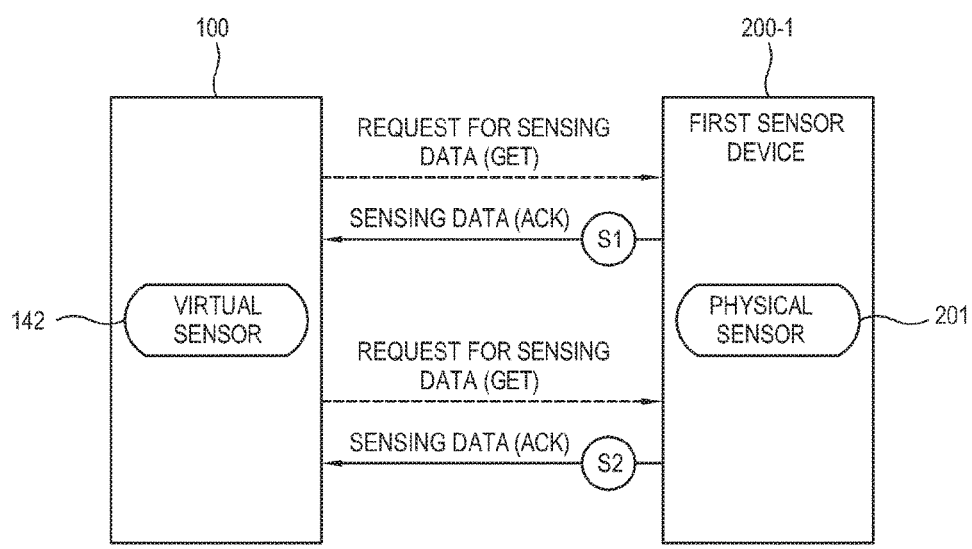
FIGS. 2, 3, 4 and 5 are diagrams illustrating an example polling method, a push method, a model-driven method and a batching method.

FIG. 2 is a illustrating an example, in which the gateway device 100 acquires data from a first sensor device 200-1 by a polling method. First, the first virtual sensor 142 of the gateway device 100 makes a request for sensing data to the sensor device 200-1 (GET). Next, the sensor device 200-1 transmits data S1 sensed by the physical sensor 201 to the gateway device 100. In addition, the first virtual sensor 142 of the gateway device 100 makes a request for sensing data to the sensor device 200-1 (GET). Next, the sensor device 200-1 transmits data S2 sensed by the physical sensor 201 to the gateway device 100. Like this, the polling method P provides the sensing data S1 and S2 of the first physical sensor 201 whenever the virtual sensor 142 of the gateway device 100 makes the request. That is, the polling method P acquires the senor data as necessary whenever the request is made.

Figure 3:
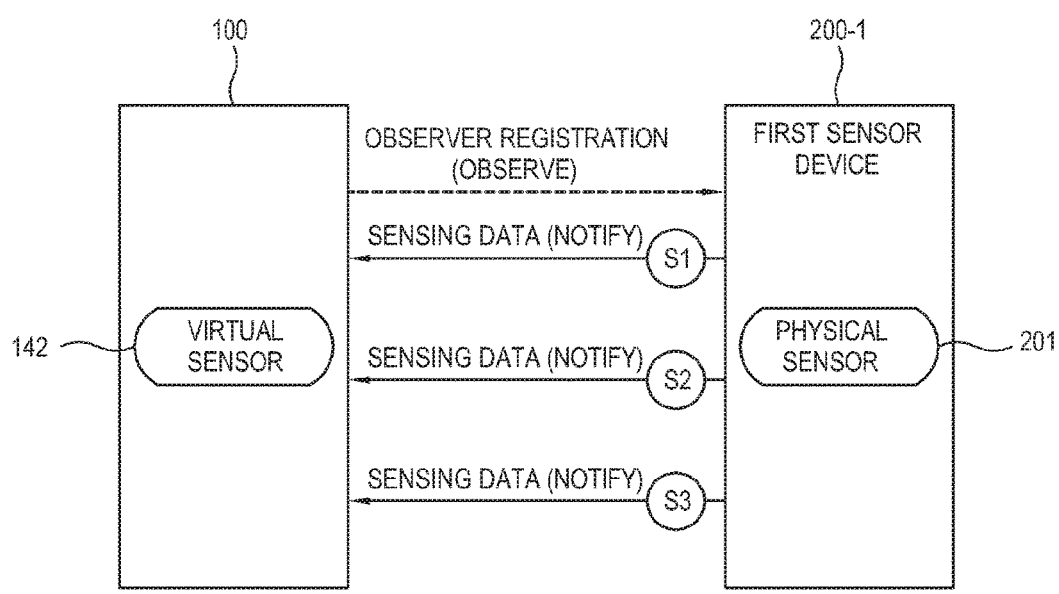

FIG. 3 is a diagram illustrating an example in which the gateway device 100 acquires data from a first sensor device 200-1 by a pushing method. First, the first virtual sensor 142 of the gateway device 100 performs observer registration to the sensor device 200-1 (OBSERVE). Then, the sensor device 200-1 periodically transits data S1, S2, S3 sensed by the physical sensor 201 to the gateway device 100. Thus, the pushing method continuously provides the sensing data S1, S2, S3 of the first physical sensor 201 through once observer registration of the virtual sensor 142 of the gateway device 100.

Figure 4:
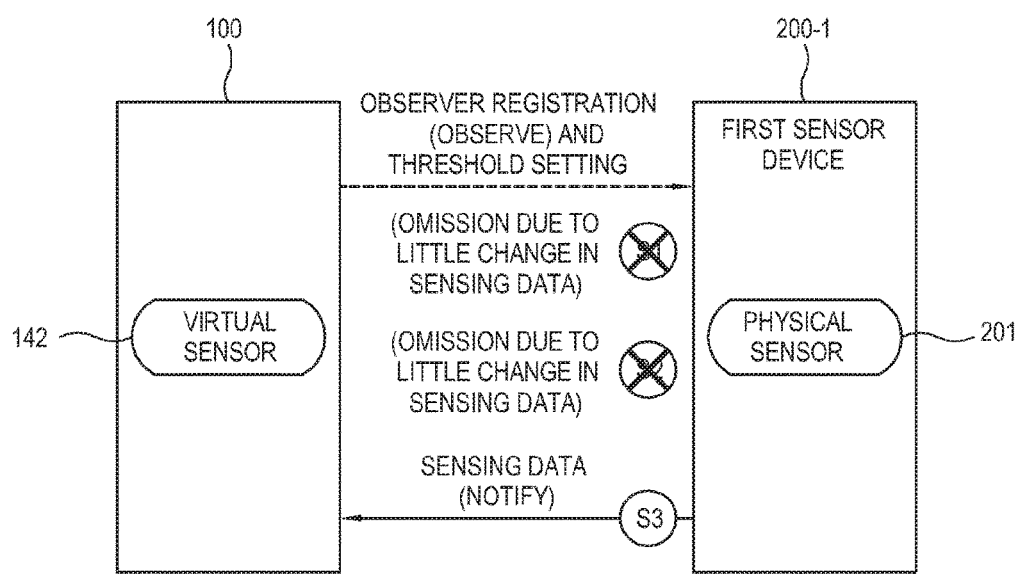

FIG. 4 is a diagram illustrating an example model-driven method (M) as a kind of the pushing method of FIG. 3. First, the first virtual sensor 142 of the gateway device 100 performs observer registration and threshold setting to the sensor device 200-1. Here, the threshold is a value of limiting a changeable size of the sensing data. The first sensor device 200-1 does not transmit the sensing data S1 and S2 of which the changed size is not higher than the threshold, but transmits only the sensing data S3 of which the changed size is higher than the threshold to the gateway device 100. Like this, the model-driven method (M) is to acquire the sensing data only when the event occurs.

Figure 5:
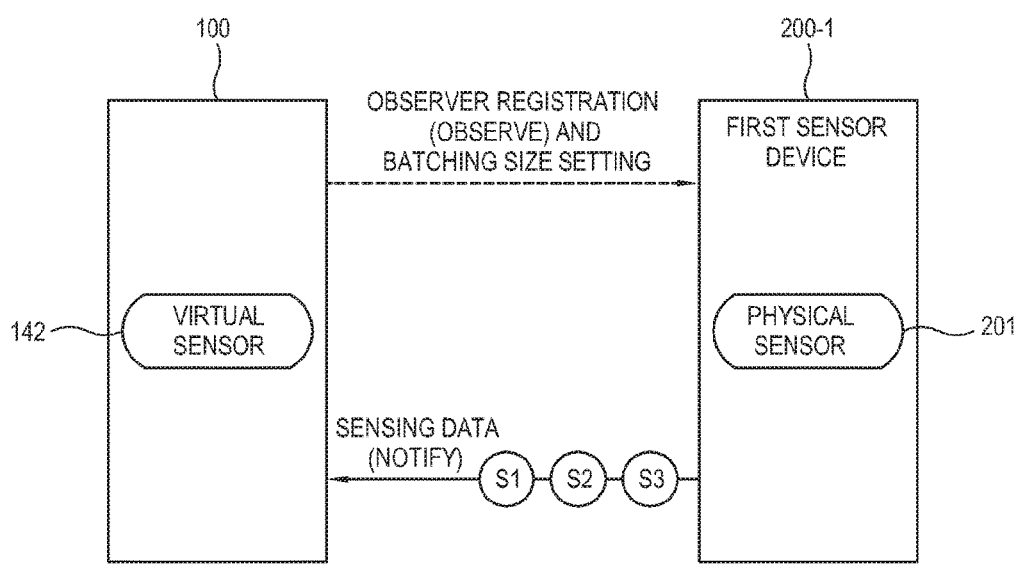

FIG. 5 is a diagram illustrating an example batching method (B) as a kind of the pushing method of FIG. 3. First, the first virtual sensor 142 of the gateway device 100 performs an observer registration (OBSERVE) and batching-size setting to the sensor device 200-1. Here, the batching-size setting is to set the size of measured sensing data to be transmitted at a time. That is, the first sensor device 200-1 accumulates the sensing data S1, S2, S3 and transmits it to the gateway device 100 at a time. Like this, the batching method (B) is to collect and transmit the sensing data as much as a preset amount.

The data acquiring method is divisionally set for the bus and the network. At the side of the bus, the data acquiring method refers to a method that the processor of the sensor device acquires data from an internal sensor module through an internal bus. At the side of the network, the data acquiring method refers to a method that the gateway device 100 acquires data from the sensor device through the network. The information about the currently set data-acquiring method includes a bus data-acquiring method (BUS), a network data-acquiring method (NET), a polling method (P), the batching method (B), the model-driven method (M) and an acquiring frequency given in the form of numerals.

The first to third virtual sensors 142, 144 and 146 serve to widely use all the physical sensors 201~205 connected to the network. The first to third virtual sensors 142, 144 and 146 collect and process the data from the physical sensors 201~205 and then transmits it to at least one of the first to third user terminals 300-1~300-3.

Each of the sensor devices 200-1, 200-2 and 200-3 includes at least one physical sensor. For example, as shown in FIG. 1, the first sensor device 200-1 includes the first physical sensor 201, the second sensor device 200-2 includes the second physical sensor 202, and the third sensor device 200-3 includes the third to fifth physical sensors 203~205. The first to fifth physical sensors 201~205 may be achieved by a three-axial acceleration sensor, a microphone, a gyroscope, a geomagnetism sensor, a gravity sensor, an optical sensor, a digital compass, a odor sensor, a proximity sensor, etc.

The user terminal 300 includes an application program that utilizes a plurality of sensor devices 201~205 through the gateway device 100. For example, as shown in FIG. 1, the first user terminal 300-1 includes first and second application programs 301~302, the second user terminal 300-2 includes third to fifth application programs 303~305, and the third user terminal 300-3 includes a sixth application program 306. The first to sixth application programs 301~306 of the first to third user terminals 300-1, 300-2 and 300-3 acquire sensing data from the first to fifth physical sensors 201~205 of the sensor devices 200-1, 200-2 and 200-3 through the first and second virtual sensors 142 and 144 of the gateway device 100. To make the plurality of first to sixth application programs 301~306 use the plurality of sensor devices 200-1, 200-2 and 200-3 simultaneously or together, efficient management is required. The user terminal 300 may include a smartphone, a wearable device, a personal portable terminal, a notebook computer, a personal computer, a desktop computer, a server, etc. The first to sixth application programs 301~306 may be achieved by a security program, a game program, a monitoring program, of the like various programs using the sensor.

Figure 6:
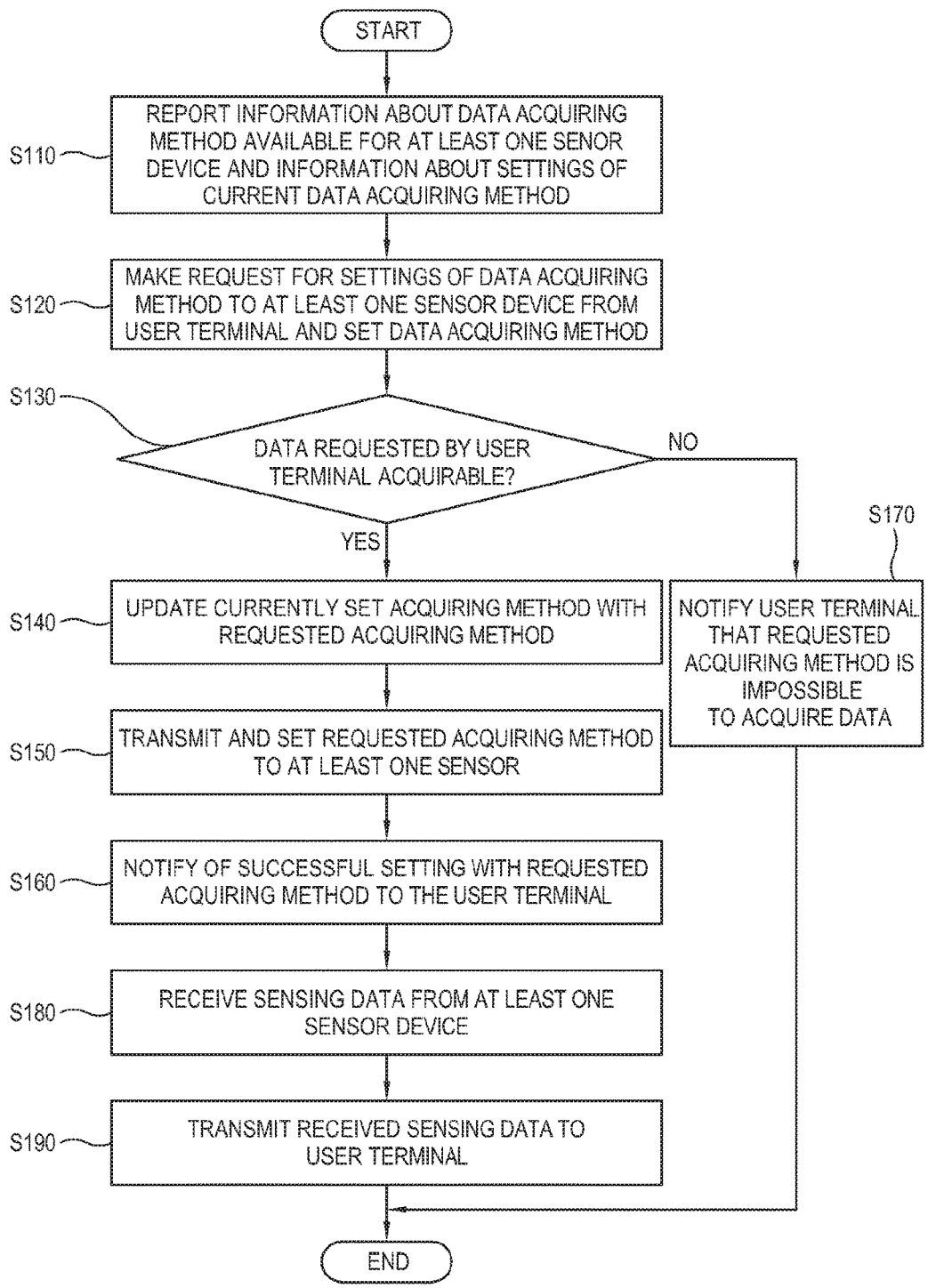
FIG. 6 is a flowchart illustrating an example of controlling a sensor device according to an example embodiment.

Below, a method of acquiring sensing data will be described with reference to FIG. 6.

Figure 7:
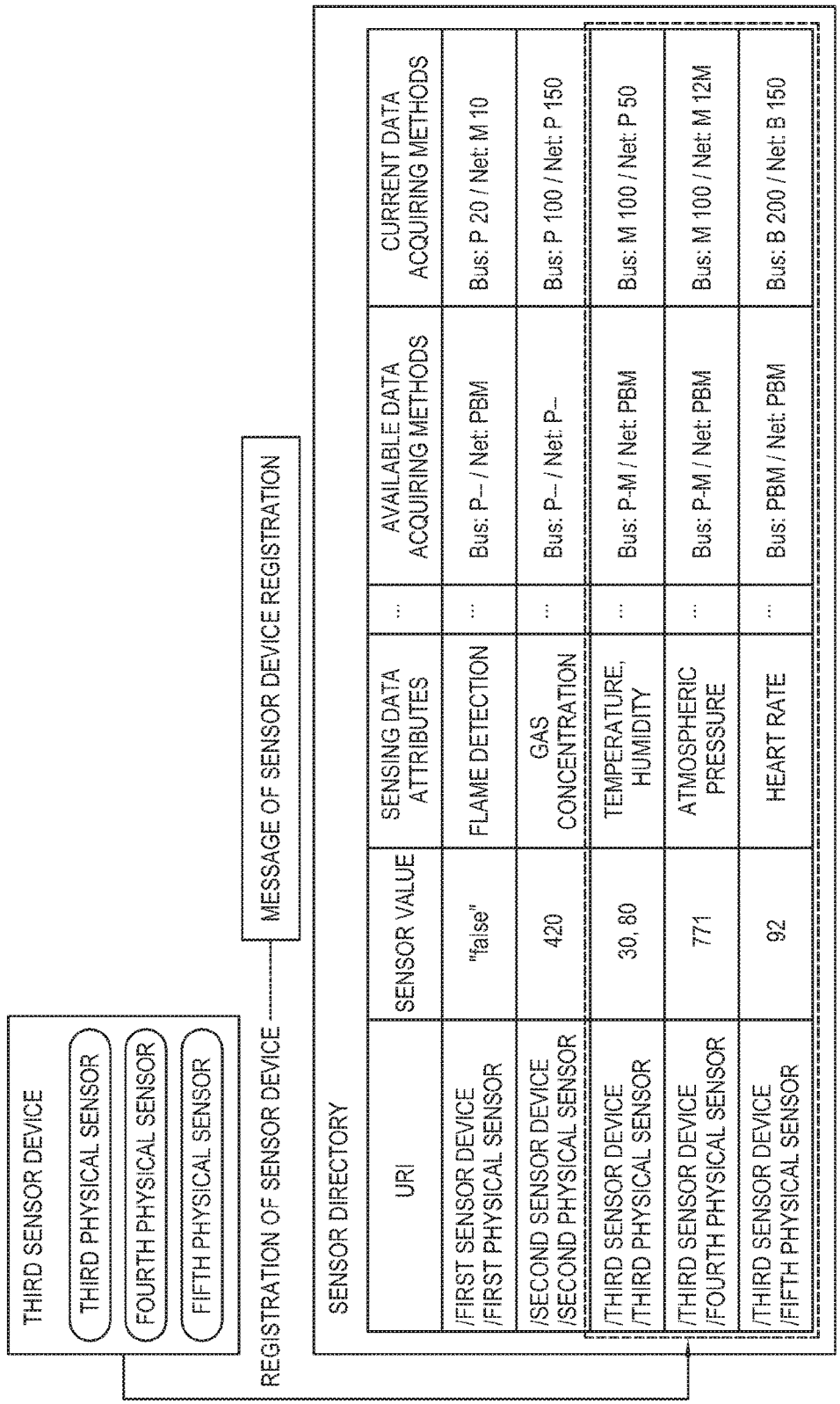
FIG. 7 is a diagram illustrating an example registration of available acquiring methods for a sensor device according to an example embodiment.

At operation S110, the plurality of first to third sensor devices 201~203 reports the available sensor-data acquiring methods when it is connected to the gateway device 100. FIG. 7 is a diagram illustrating an example that the third sensor device 200-3 reports on the available sensor-data acquiring methods to the gateway device 100. In FIG. 7, the third sensor device 200-3 sends the gateway device 100 a sensor device registration message as follows.

{base-URI "/third sensor device",
 {URI "/third sensor device/third physical sensor", value: {"temperature":30, "humidity":80}, . . . , available methods: {BUS: "P-M", NET: "PBM"}, default methods:{BUS: "M", BUS Strength:100, NET: "P", NET Strength:50}}
 {URI "/third sensor device/fourth physical sensor", value: {"atmospheric pressure":771}, . . . , available methods: {BUS: "P-M", NET: "PBM"}, default method:{BUS: "M", BUS Strength:100, NET: "M", NET Strength:120}}
 {URI "/third sensor device/fifth physical sensor", value: {"heart rate":92}, . . . , available methods:{BUS: "P-M", NET:"PBM"}, default method:{BUS: "B", BUS Strength: 200, NET: "B", NET Strength:150}}}

The gateway device 100 parses the foregoing sensor device registration message from the third sensor 200-3 and registers information about the third to fifth physical sensors of the third sensor device to the sensor direction 134 as shown in dotted lines of FIG. 7.

FIG. 8 illustrates the example sensor directory 134 in which information about the plurality of first to fifth physical sensors connected through the network is registered. The sensor directory 134 includes sensor values, sensing data attribute, a user list, available data-acquiring methods, the current data-acquiring methods of the plurality of first to fifth physical sensors. Referring to FIG. 8, the first physical sensor 201 of the first sensor device 200-1 is registered with the sensor values: "false", the sensing data attribute: "flame detection", a user list: "first user terminal, first virtual sensor", available data-acquiring methods: "BUS:P--, NET: PBM" and the current data-acquiring methods: "BUS:P 20, NET:M 10". The second physical sensor 202 of the second sensor device 200-2 is registered with the sensor values: "420", the sensing data attribute: "gas concentration", a user list: "first virtual sensor, second virtual sensor", available data-acquiring method: "BUS:P--, NET:P--" and the current data-acquiring methods: "BUS:P 100, NET:P 150". The third physical sensor 203 of the third sensor device 200-3 is registered with the sensor values: "30, 80", the sensing data attribute: "temperature, humidity", a user list: "first virtual sensor, second virtual sensor", available data-acquiring methods: "BUS:P_M, NET:PBM" and the current data-acquiring methods: "BUS:M 100, NET:P 50". The fourth physical sensor 204 of the third sensor device 200-3 is registered with the sensor values: "771", the sensing data attribute: "atmospheric pressure", a user list: "second virtual sensor", available data-acquiring methods: "BUS:P_M, NET:PBM" and the current data-acquiring methods: "BUS:M 100, NET:M 120". The fifth physical sensor 205 of the third sensor device 200-3 is registered with the sensor values: "92", the sensing data attribute: "heart rate", a user list: "second virtual sensor", available data-acquiring methods: "BUS:PBM, NET:PBM" and current data-acquiring methods: "BUS:B 200, NET:B 120".

Figure 9:
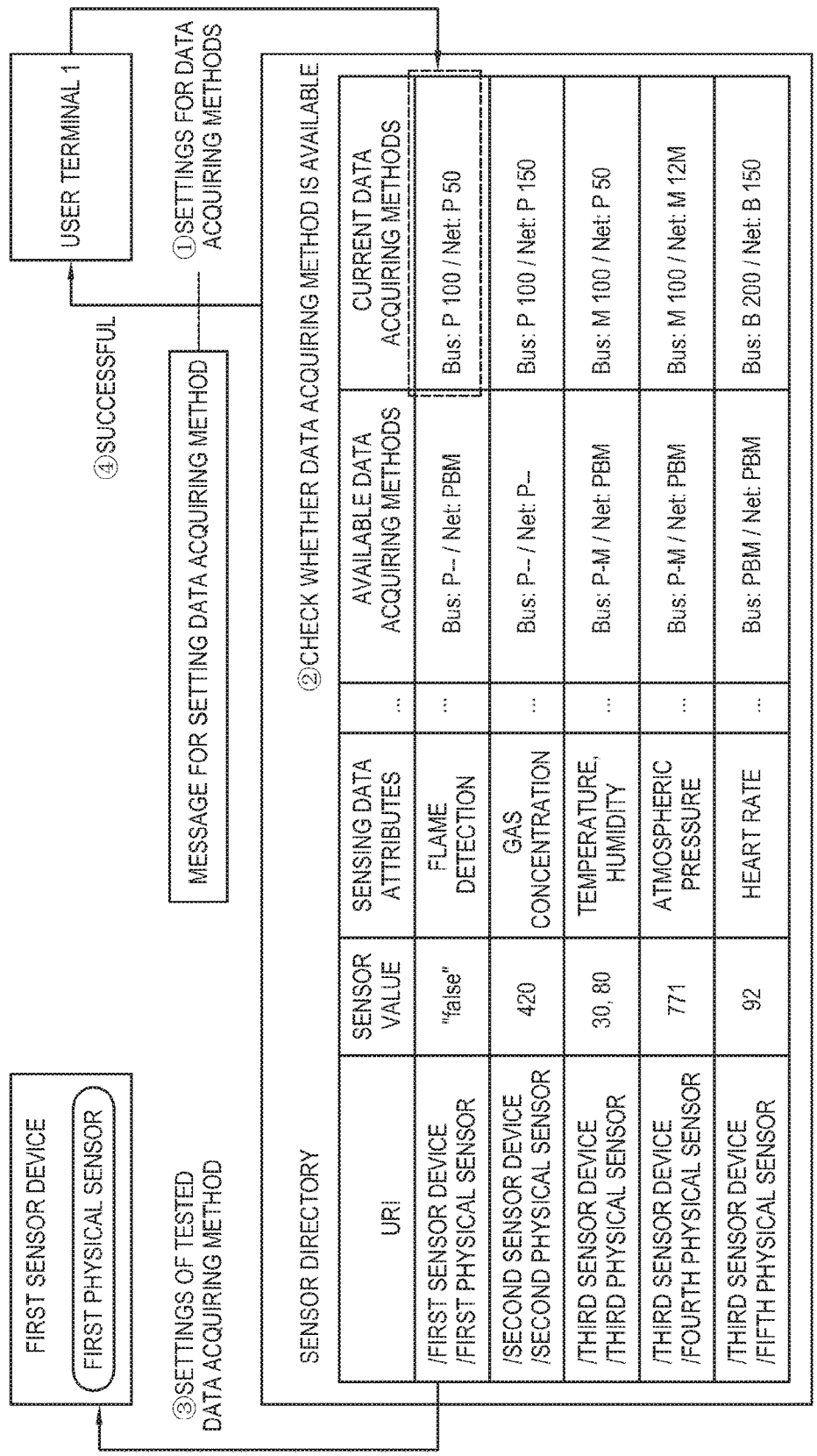
FIGS. 9 and 10 are diagrams illustrating example determination of available sensor-data acquiring methods according to an example embodiment.

At operation S120, the first user terminal 300-1 sets the sensor-data acquiring method to the gateway device 100 in response to a data-acquiring request. FIG. 9 is a diagram illustrating an example process of setting the data-acquiring method for the first user terminal 300-1. As illustrated in FIG. 9, the first user terminal 300-1 transmits a first message for setting the data-acquiring method to the gateway device 100. The first message for setting the data-acquiring method is as follows.

{method: {BUS: "P", BUS Strength: 100, NET: "P", NET Strength: 50}

At operation S130, the processor 110 of the gateway device 100 parses the message for setting the data acquiring method and determines whether the acquiring methods of BUS: "P" and NET: "P" are suitable for the available data-acquiring methods of the sensor directory 134. Since the available data-acquiring methods are "BUS:P--, NET: PBM" in FIG. 8, the requested acquiring methods of BUS: "P" and NET: "P" are acquirable.

At operation S140, if the requested acquiring method of the first user terminal 300-1 can acquire data, the current data-acquiring method is updated as shown in the dotted lines of FIG. 9.

At operation S150, the gateway device 100 forwards the determined requested acquiring method of the first user terminal 300-1, e.g., "BUS:P 100, NET:P 50" to the first physical sensor 201 of the first sensor device 200-1. The processor 210 of the first sensor device 200-1 sets the first physical sensor 201 with reference to the requested acquiring method, i.e. "BUS:P 100, NET:P 50".

At operation S160, the gateway device 100 sends the first user terminal 300-1 a message that the requested acquiring method is successfully set.

Figure 10:
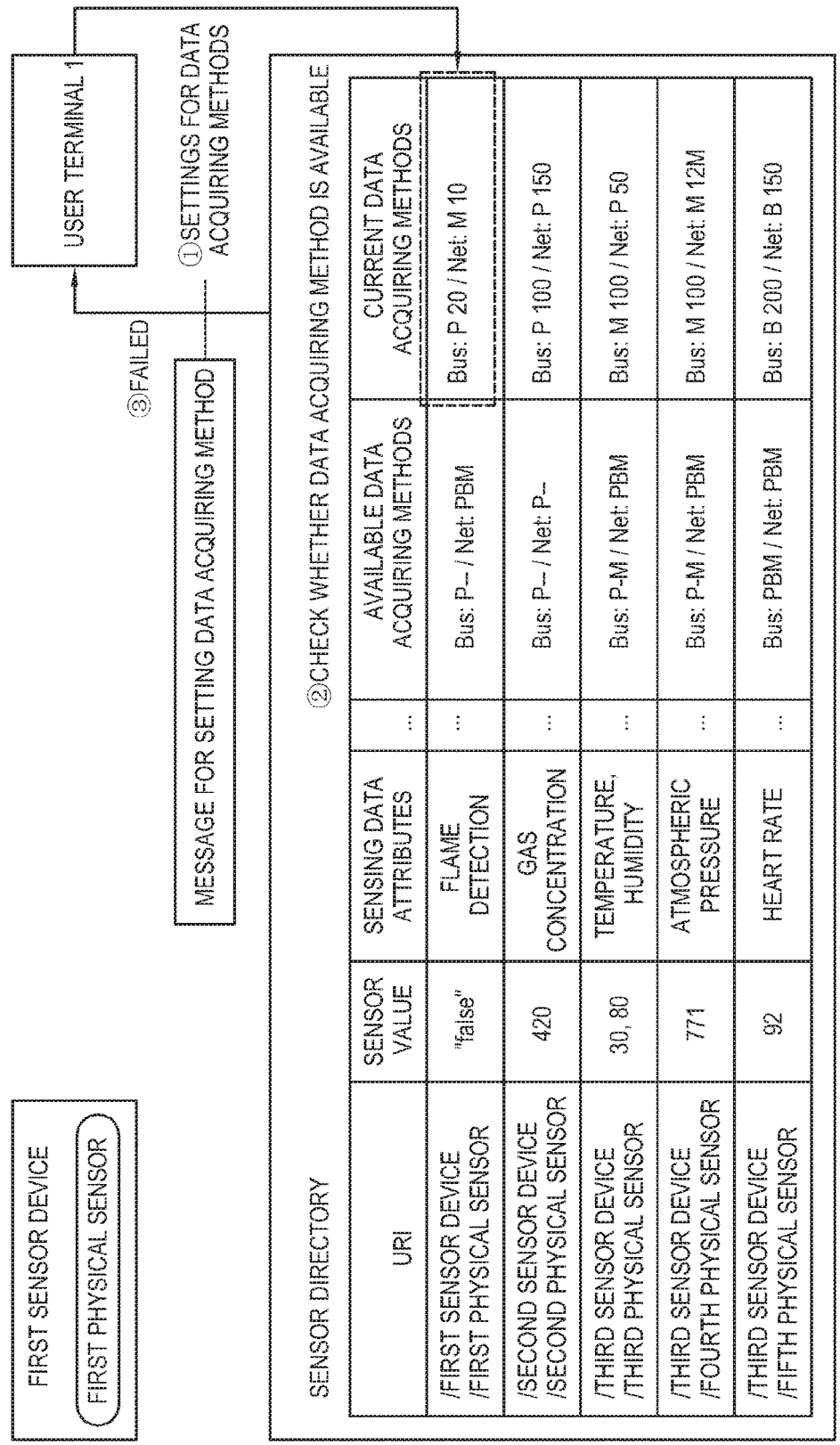

FIG. 10 illustrates another example of a setting process of the data acquiring method of the first user terminal 300-1. At operation S120, the first user terminal 3001 may transmit a message for setting the data acquiring method. The message for setting the data acquiring method is as follows.

{Method: {BUS: "M", BUS Strength: 230, NET: "M", NET Strength: 50}

At operation S130, the processor 110 of the gateway device 100 determines whether the acquiring methods of BUS: "M" and NET: "M" is suitable for the available data acquiring methods of the sensor directory 134 when receiving the message for setting the data acquiring method. Referring to FIG. 10, the available data acquiring methods are "BUS:P--, NET:PBM", the requested acquiring method BUS: "M" is not acquirable but only NET: "P" is acquirable.

At operation S170, the gateway device 100 sends the user terminal 301 a message that the requested acquiring method is not settable.

At operation S180, the gateway device 100 receives the sensing data from the first physical sensor 201 of the first sensor device 200-1 by the set method BUS:P 100. That is, the sensing data is acquired by the polling method, at an acquired frequency of 100 (every 5 seconds).

At operation 5190, the gateway device 100 sends the first user terminal 301 the sensing data received from the first physical sensor 201 of the first sensor device 200-1. Here, the first virtual sensor 142 may process the sensing data received from the first physical sensor 201 of the first sensor device 200-1 and then transmit the processed data to the user terminal 300. Of course, the first virtual sensor 142 may directly transmit the sensing data received from the first physical sensor 201 of the first sensor device 200-1 to the user terminal 300 without processing the received sensing data.

According to an example embodiment, the data acquiring methods and acquiring frequencies of the different kinds of first to third sensor devices 200-1, 200-2 and 200-3 are applied in a lump. To this end, the settings of the data acquiring methods and acquiring frequencies of the sensor devices are virtualized as 'data acquiring setting'. In particular, the data acquiring frequency is varied in definition and range depending on the kinds of sensor-data acquiring methods, and thus virtualized into a single integer value so that data acquiring setting can be applied in a lump to various kinds of first to third sensor devices 200-1, 200-2 and 200-3.

According to an example embodiment, the data acquiring method of the first to third sensor devices 200-1, 200-2 and 200-3 is set by the gateway device 100. The gateway device 100 refers to a control device that is connected to all the first to third sensor devices 200-1, 200-2 and 200-3 of the local network, and brings the sensing data from the first to third sensor devices 200-1, 200-2 and 200-3 or applies the settings of the first to third sensor devices 200-1, 200-2 and 200-3. A conventional gateway device also includes a sensor directory where data of a physical sensor and metadata information are stored. According to an example embodiment, the sensor directory is extended to manage information about the sensing data-acquiring method. When the sensing data-acquiring method is set in the user terminal 300, the method setting message is transmitted to the first to third sensor devices 200-1, 200-2 and 200-3 after it is determined whether the method is available with reference to the sensor directory.

The method and frequency of acquiring the available sensing data are varied depending on the physical sensors. Under the Internet of Things environment using the virtual sensors, a number of heterogeneous physical sensors need to be controlled in a lump with respect to the kind and frequency of acquiring the sensing data. Therefore, according to an example embodiment, the kind and frequency of data acquiring methods for the first to fifth physical sensors 201~205 are virtualized by the sensing data-acquiring method.

In accordance with the kinds of sensing data-acquiring methods, factors for determining the 'frequency' of acquiring data are varied. In the polling method (P), the frequency is determined by a cycle of acquiring the sensing data. In the batching method (B), the frequency is determined by the number of pieces of sensing data to be transmitted at a time (i.e. by a batching size). In the model-driven method (M), the frequency is determined by a threshold of determining whether to transmit the sensing data. For example, the sensor device 200 or the gateway device 100 infrequently acquires the sensing data if the polling period becomes longer in the polling method (P), if the threshold becomes higher in the model-driven method (M), and if the batching size increases in the batching method (B). Therefore, it is possible to reduce power consumed in the sensor device 200 and the gateway device 100 by changing the factors of determining the data acquiring frequency.

Like this, the 'kind' and 'frequency' of acquiring the sensing data will be collectively called the sensing data-acquiring method. The kinds of methods can be set only within the data acquiring methods available in the sensor device. In particular, the factors of the acquiring frequency is varied depending on the types of sensor devices, and therefore equally represented by integer values in order to provide a consistent interface.

Figure 11:
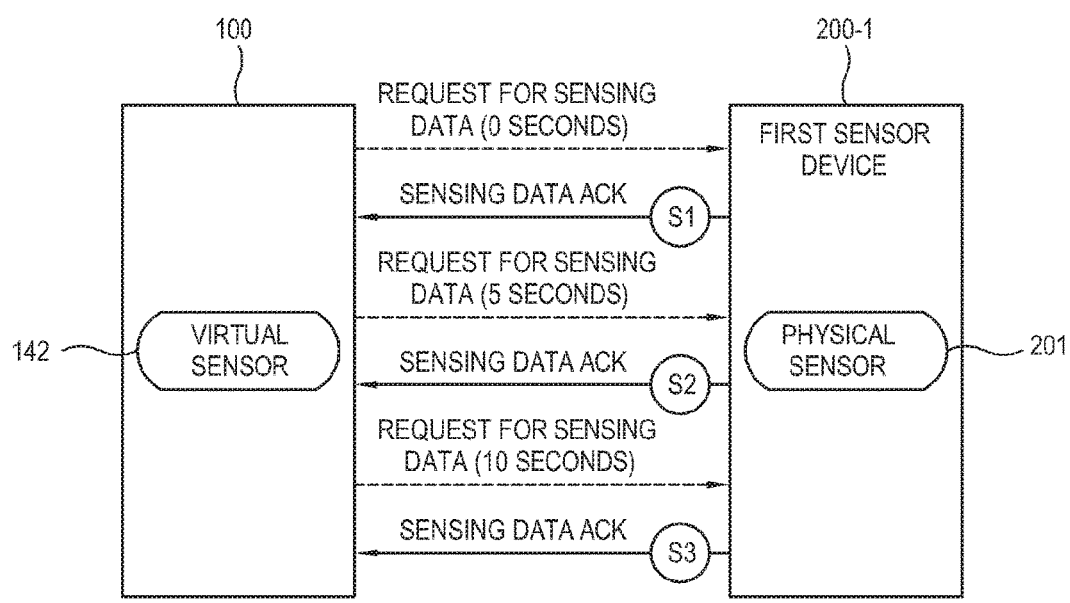
FIGS. 11, 12, 13, 14, 15 and 16 are diagrams illustrating examples of acquiring sensing data by making a connection between the sensor-data acquiring methods and the acquiring frequencies.

FIG. 11 is a diagram illustrating an example in which the acquiring frequency value is 50 in the polling method (P). The gateway device 100 transmits a request (GET) for sensing data to the sensor device 200 every 5 seconds, and the sensor device 200 transmits sensing data S1, S2 and S3 in sequence to the gateway device 100 every 5 seconds in response to the sensing data request.

Figure 12:
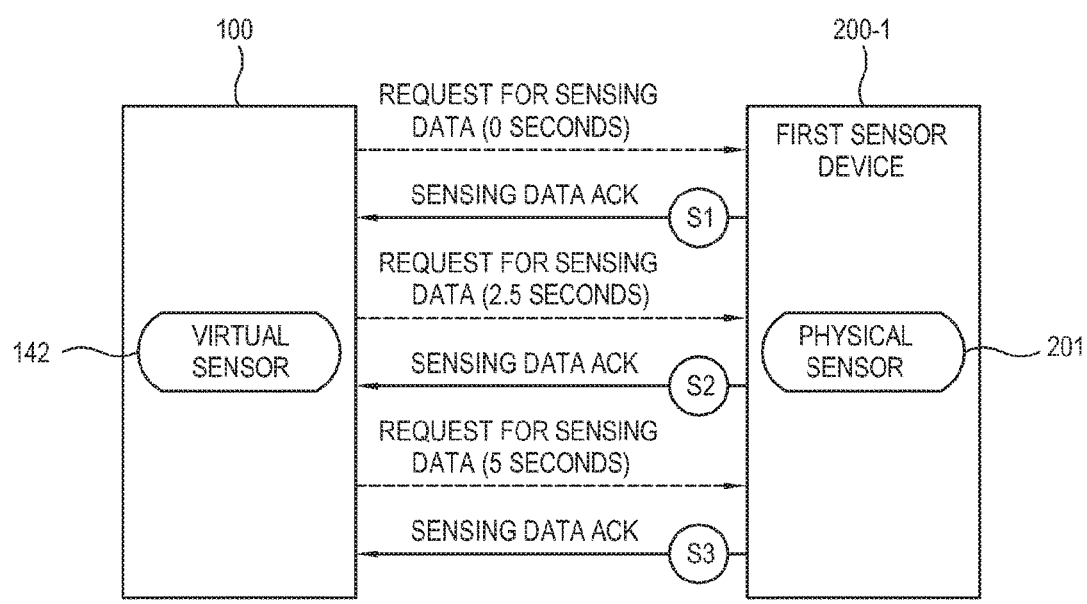

FIG. 12 is a diagram illustrating an example in which the acquiring frequency value is 100 in the polling method (P). The gateway device 100 transmits a request (GET) for sensing data to the sensor device 200 every 2.5 seconds, and the sensor device 200 transmits sensing data S1, S2 and S3 in sequence to the gateway device 100 every 2.5 seconds in response to the sensing data request. Like this, if the sensing data is acquired per 2.5 seconds shorter than 5 seconds, increase in the power consumption of the sensor device 200 has to be taken into account for proper settings.

FIG. 11 and FIG. 12, are examples in which the sensing data-acquiring period becomes shorter as the acquiring frequency value increases. Alternatively, the sensing data-acquiring period may become longer as the acquiring frequency value increases.

Figure 13:
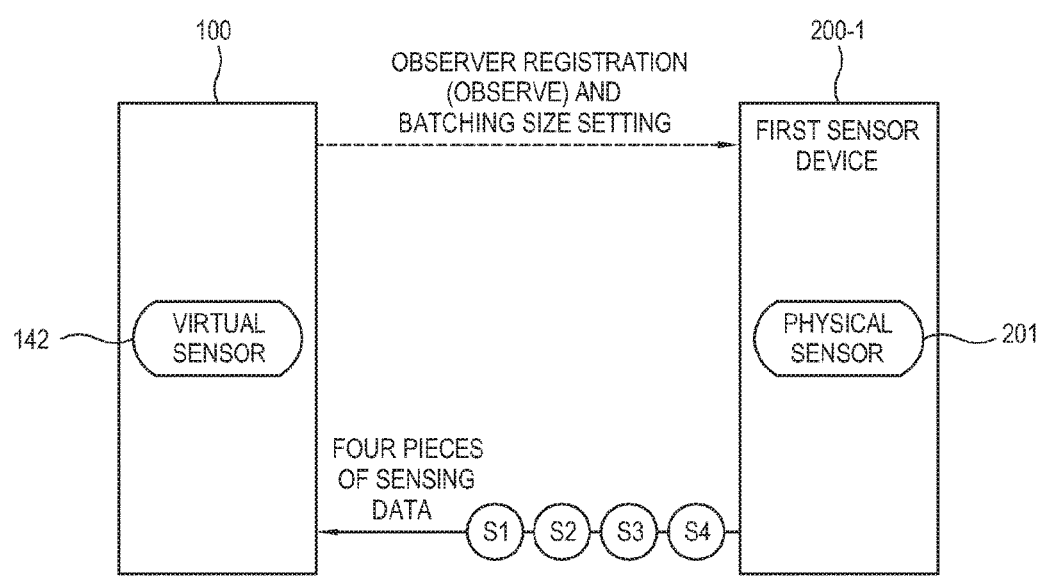

FIG. 13 is a diagram illustrating an example in which the acquiring frequency value is 50 in the batching method (B). If the gateway device 100 is set to the observer registration (OBSERVE) and the batching size (at a frequency value of 50), the sensor device 200 collects four pieces of sensing data and transmits them to the gateway device 100 in a lump.

Figure 14:
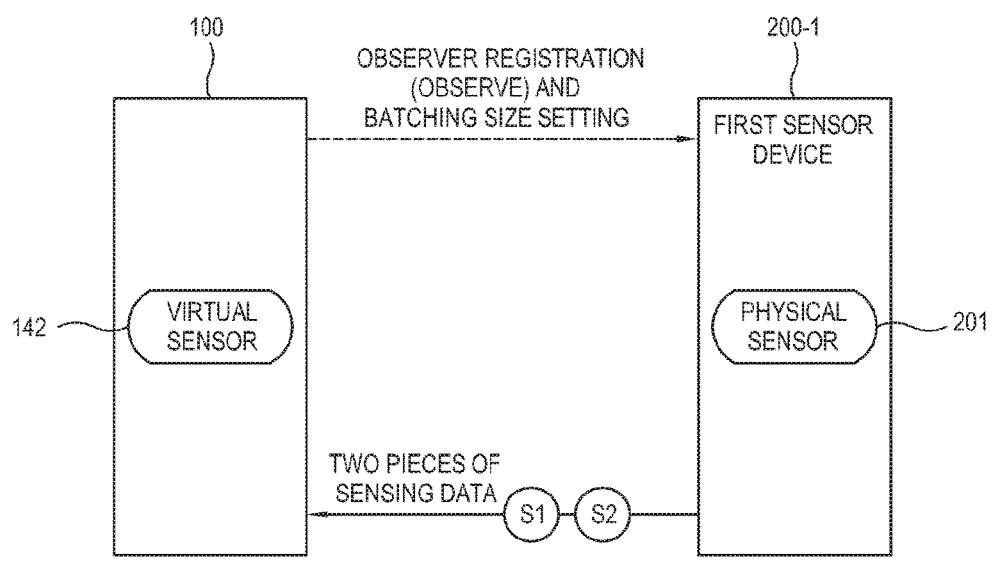

FIG. 14 is a diagram illustrating an example in which the acquiring frequency value is 100 in the batching method (B). If the gateway device 100 is set to the observer registration (OBSERVE) and the batching size (at a frequency value of 1000), the sensor device 200 collects two pieces of sensing data S1~S2 and transmits them to the gateway device 100 in a lump.

FIG. 13 and FIG. 14, are examples in which the number of pieces of sensing data to be transmitted decreases as the acquiring frequency value increases. Alternatively, the number of pieces of sensing data to be transmitted may increase as the acquiring frequency value increases.

Figure 15:
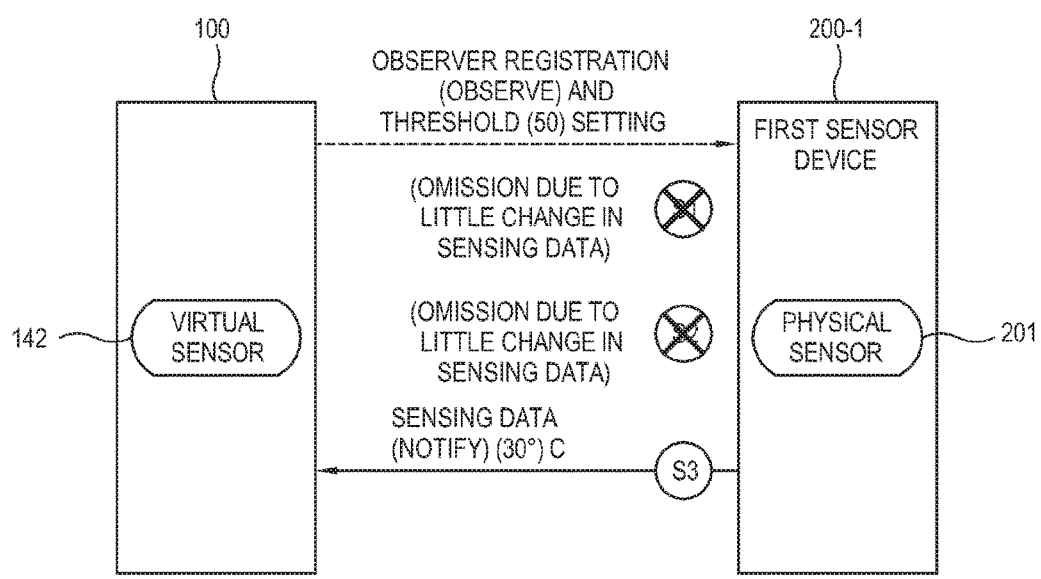

FIG. 15 is a diagram illustrating an example in which the acquiring frequency value is 50 in the model-driven method (M). If the gateway device 100 is set to the observer registration (OBSERVE) and the batching size (at a frequency value of 50), the sensor device 200 transmits only the sensing data S3 higher than 30° C. to the gateway device 100.

Figure 16:
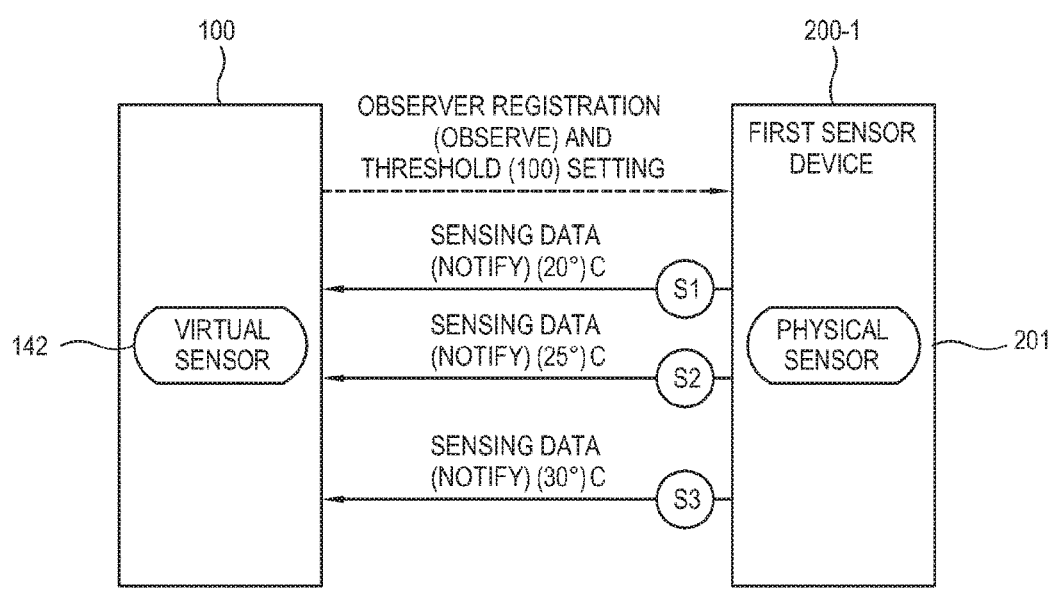

FIG. 16 is a diagram illustrating an example in which the acquiring frequency value is 100 in the model-driven method (M). If the gateway device 100 is set to the observer registration (OBSERVE) and the batching size (at a frequency value of 100), the sensor device 200 transmits the sensing data S1 (20° C.), the sensing data S2 (25° C.) and the sensing data S3 (30° C.) higher than 15° C. to the gateway device 100.

FIG. 15 and FIG. 16, are examples in which the threshold for transmitting the sensing data at a time decreases as the acquiring frequency value increases. Alternatively, the threshold for transmitting the sensing data at a time may increase as the acquiring frequency value increases.

As described above, the acquiring frequency value for the sensing data may be differently applied in accordance with the sensing data-acquiring methods.

Figure 17:
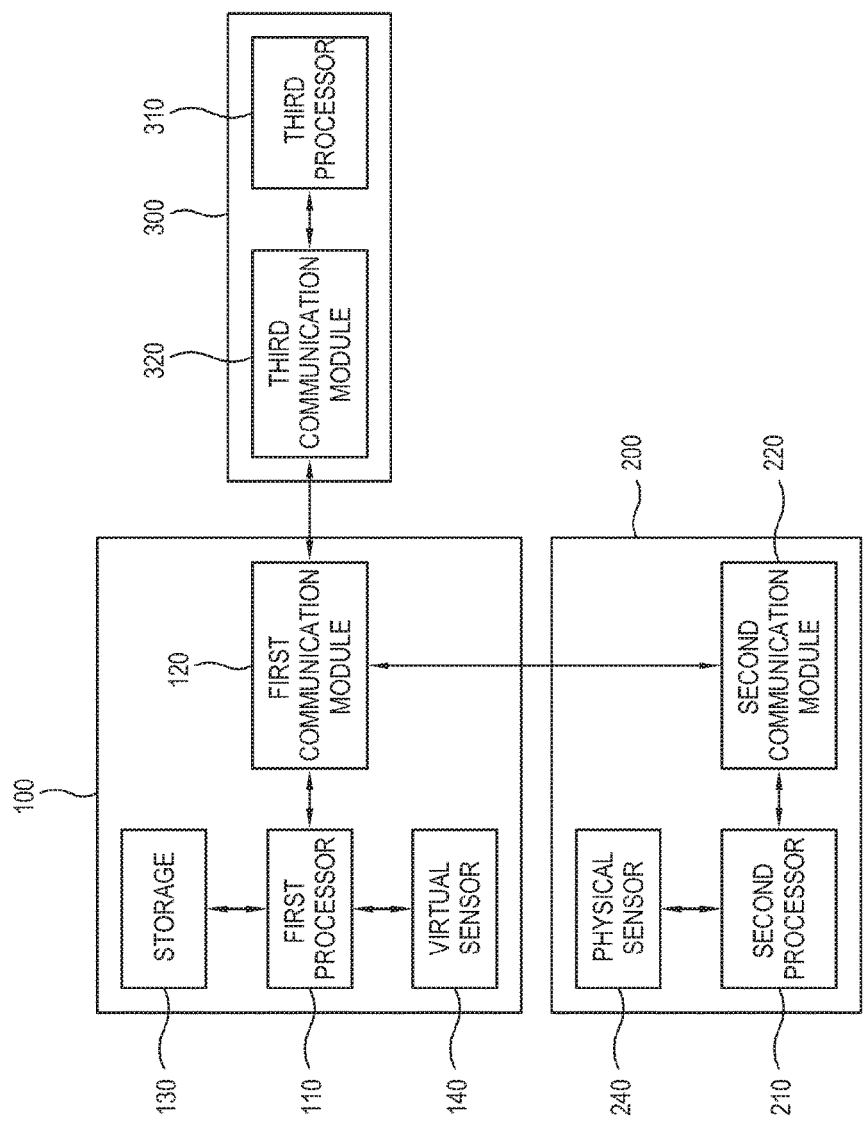
FIG. 17 is a block diagram illustrating an example gateway device, a sensor device and a user terminal according to an example embodiment.

FIG. 17 is a block diagram illustrating an example gateway device 100, the sensor device 200 and the user terminal 300 according to an example embodiment.

The gateway device 100 includes a first processor (e.g., including processing circuitry) 110, a first communication module (e.g., including communication circuitry) 120, a first storage 130, and a virtual sensor 140. In addition to these elements, the gateway device 100 may further include other elements.

The first processor 110 may be achieved by software, hardware and may include various processing circuitry, such as, for example, and without limitation, a control board including a dedicated processor, a central processing unit (CPU), a micro-processing unit (MPU), application specific integrated circuits (ASICs), digital signal processors(DSPs), digital signal processing devices (DSPDs), programmable logic devices (PLDs), field programmable gate arrays (FPGAs), micro-controllers, microprocessors, etc., or combination of hardware and software. The first processor 110 generally controls the elements of the gateway device 100, e.g. the first communication module 120, the first storage 130, and the virtual sensor 140, etc. and processes various pieces of sensing data received, input or sensed from the plurality of first to third sensor devices 201~205 through communication or a network by software or hardware. The first processor 110 may include an operating system (OS). Further, the first processor 110 may include an application (or program) for processing various pieces of input or processed information. The first processor 110 parses a sensing data-acquiring setting message requested by the user terminal 300, and determines whether the data is acquirable with reference to the sensor directory.

The first communication module 120 may include various communication circuitry and communicates with at least one sensor device 200-1, 200-2 or 200-3 or the first to third user terminals 301~303 connected through the network. The first communicator 120 may employ various communication circuitry, such as, for example, and without limitation, a data communication module for VDSL, Ethernet, Token-ring, high definition multimedia interface (HDMI), a universal serial bus (USB), Component, LVDS, HEC, etc.; a mobile communication module for 2G, 3G, 4G, long-term evolution (LTE), etc.; a wireless Internet module for wireless local area network (WLAN), wireless fidelity (Wi-Fi), wireless broadband (Wibro), world interoperability for microwave access (Wimax), high speed downlink packet access (HSDPA), etc.; a near field communication module for Bluetooth, radio frequency identification (RFID), infrared data association (IrDA), ultra-wideband (UWB), ZigBee, etc.

The first storage 130 stores data. The first storage 130 is accessed by the first processor 110 to read, record, modify, delete and update the data. The data stored in the first storage 130 may for example the sensing data transmitted from the first to fifth physical sensors 201~205, data processed by the first to third virtual sensors 142, 144 and 146, and the sensor directory 134 as shown in FIG. 8. Of course, the first storage 130 may store the operating system, various applications executable on the operating system, etc. The first storage 130 may store a program (or application) for managing the sensor device of the virtual sensor 140, and processing the sensing data.

The first storage 130 may include at least one of storage medium such as a flash memory type, a hard disk type, a multimedia card micro type, a card type memory (e.g. an SD or XD memory, etc.), a random access memory (RAM), a static random access memory (SRAM), a read-only memory (ROM), an electrically erasable programmable read-only memory (EEPROM), a programmable read-only memory (PROM) a magnetic memory, a magnetic disk and an optical disk.

The virtual sensor 140 uses software to process the sensing data acquired by managing the plurality of sensor devices 200 connected through the network and provides the processed sensing data to the user terminal 300.

The sensor device 200 includes the second processor (e.g., including processing circuitry) 210, the second communication module (e.g., including communication circuitry) 220 and the physical sensor 240. In addition to these elements, the sensor device 200 may include other elements.

The second processor 210 generally controls the elements of the sensor device 200. The second processor 210 parses the acquiring method setting message received from the gateway device 100 and uses the physical sensor 240. The second processor 210 transmits the sensing data sensed by the physical sensor 240 using the setting method to the gateway device 100 via the second communication module 220.

The second processor 210 may be achieved by software, hardware and may include various processing circuitry, such as, for example, and without limitation, a control board including a dedicated processor, a central processing unit (CPU), a micro-processing unit (MPU), application specific integrated circuits (ASICs), digital signal processors (DSPs), digital signal processing devices (DSPDs), programmable logic devices (PLDs), field programmable gate arrays (FPGAs), micro-controllers, microprocessors, etc., or combination of hardware and software.

The second communication module 220 may include various communication circuitry and communicates with the gateway device 100. The second communication module 220 may employ various communication circuitry, such as, for example, and without limitation, a data communication module for VDSL, Ethernet, Token-ring, high definition multimedia interface (HDMI), a universal serial bus (USB), Component, LVDS, HEC, etc.; a mobile communication module for 2G, 3G, 4G, long-term evolution (LTE), etc.; a wireless Internet module for wireless local area network (WLAN), wireless fidelity (Wi-Fi), wireless broadband (Wibro), world interoperability for microwave access (Wimax), high speed downlink packet access (HSDPA), etc.; a near field communication module for Bluetooth, radio frequency identification (RFID), infrared data association (IrDA), ultra-wideband (UWB), ZigBee, etc.

The physical sensor 240 performs sensing through the setting method. The physical sensor 240 may be achieved by a three-axial acceleration sensor, a microphone, a gyroscope, a geomagnetism sensor, a gravity sensor, an optical sensor, a digital compass, an odor sensor, an proximity sensor, etc.

The user terminal 300 includes a third processor (e.g., including processing circuitry) 310 and a third communication module (e.g., including communication circuitry) 320. In addition to these elements, the user terminal 300 may include other elements.

The third processor 310 generally controls the elements of the user terminal 300. The third processor 310 transmits the message for setting the sensor-data acquiring method requested by the application program to the gateway device 100 through the third communication module 320, and receives the sensing data from the gateway device 100 through the third communication module 320.

The third processor 310 may be achieved by software, hardware and may include various processing circuitry, such as, for example, and without limitation, a control board including a central processing unit (CPU), a micro-processing unit (MPU), application specific integrated circuits (ASICs), digital signal processors (DSPs), digital signal processing devices (DSPDs), programmable logic devices (PLDs), field programmable gate arrays (FPGAs), micro-controllers, microprocessors, etc., or combination of hardware and software.

The third communication module 320 communicates with the gateway device 100 to transmit the message for setting the sensor-data acquiring method and receive the sensing data. The third communication module 320 may employ various communication circuitry, such as, for example, and without limitation, a data communication module for VDSL, Ethernet, Token-ring, high definition multimedia interface (HDMI), a universal serial bus (USB), Component, LVDS, HEC, etc.; a mobile communication module for 2G, 3G, 4G, long-term evolution (LTE), etc.; a wireless Internet module for wireless local area network (WLAN), wireless fidelity (Wi-Fi), wireless broadband (Wibro), world interoperability for microwave access (Wimax), high speed downlink packet access (HSDPA), etc.; a near field communication module for Bluetooth, radio frequency identification (RFID), infrared data association (IrDA), ultra-wideband (UWB), ZigBee, etc.

The electronic device according to an example embodiment may be effectively used in the Internet of Things environment using the virtual sensor. That is, in the state that many kinds and number of sensors are connected through the network such as the Internet of Things, and these sensors are independently used in or shared in common among many applications of many user terminals, the electronic device mediates the performances of the sensor devices and the requests of the applications, thereby acquiring the data by the most efficient method.

Further, the electronic device according to an example embodiment reduces power consumption of the sensor device by applying the sensing data acquiring method suitable for the requests of various kinds of Internet-of-Things sensor devices and virtual sensors Even if the Internet-of-Things sensor device mostly uses a small battery, it is possible to extend a battery lasting time and increase the utility of the virtual sensor.

Although a various example embodiments and drawings have been illustrated and described, it will be appreciated by those skilled in the art that various modifications and changes may be made in these example embodiments without departing from the principles and spirit of the disclosure.

The operations according to the foregoing example embodiments may be performed by a single or a plurality of processors. In this case, a program command for performing the operations to be implemented by various computers may be recorded in a computer readable medium. The computer readable medium may contain a program command, a data file, a data structure, etc. or combination thereof. The program command may be specially designed and made for the foregoing embodiments, or publicly known and available to those skilled in the art. As an example of the computer readable medium, there are a magnetic medium such as a hard disk drive, a floppy disk, a magnetic tape, etc. an optical medium such as a compact disc read only memory (CD-ROM), a digital versatile disc (DVD), a magnetic-optical medium such as a floptical disk, and a hardware device such as a read only memory (ROM), a random access memory (RAM), a flash memory, etc. specially configured to store and execute a program command. As an example of the program command, there is not only a machine code made by a compiler but also a high-level language code to be executable by a computer through an interpreter or the like. If a process for controlling at least one sensor device described in this example embodiment is fully or partially achieved by a computer program, the computer readable medium storing the computer program also belong to the present disclosure.

Therefore, the foregoing is considered as illustrative only. The scope of the disclosure is defined in the appended claims and their equivalents. Accordingly, all suitable modification and equivalents may fall within the scope of the disclosure.

What is claimed is:

1. An electronic device configured to connect with at least one sensor device through a network, the electronic device comprising:
 a communicator comprising communication circuitry configured to communicate with the at least one sensor device and a user terminal;
 a storage; and
 a processor configured to:
  based on the communicator being connected with the at least one sensor device, receive information on data acquiring methods available for the at least one sensor device therefrom;
  store the received information in the storage;
  based on a request for setting a data acquiring method with respect to the at least one sensor device from the user terminal, identify whether the data acquiring method included in the request is suitable based on the stored information on the data acquiring methods, the user terminal being configured to acquire sensing data from the at least one sensor device through the electronic device,
  based on the data acquiring method included in the request being suitable, forward the identified data acquiring method to the at least one sensor device to set the at least one sensor device with reference to the forwarded data acquiring method; and
  receive the sensing data from the at least one sensor based on the forwarded data acquiring method.

2. The electronic device according to claim 1, wherein the information on the data acquiring method comprises information on one or more of: a polling method, a batching method and a model-driven method.

3. The electronic device according to claim 2, wherein the processor is configured further to receive and store a data acquiring frequency associated with one or more of the polling method, the batching method and the model-driven method.

4. The electronic device according to claim 3, wherein the data acquiring frequency is configured to be virtualized into numerals regardless of the data acquiring methods.

5. The electronic device according to claim 1, wherein the processor is further configured to send the user terminal a result of determining whether the data is acquirable.

6. The electronic device according to claim 1, wherein the processor is configured to update information on settings of a current data acquiring method in response to the data acquiring request of the user terminal based on the data acquiring method included in the request being suitable.

7. The electronic device according to claim 6, wherein the processor is configured to transmit the information on the settings of the current data acquiring method to the at least one sensor device based on the data acquiring method included in the request being suitable.

8. The electronic device according to claim 1, further comprising at least one virtual sensor configured to acquire and process sensing data from the at least one sensor device.

9. The electronic device according to claim 8, wherein the virtual sensor is configured to transmit the processed sensing data to the user terminal.

10. The electronic device according to claim 9, wherein the processor is configured to determine data acquiring settings based on priorities if two or more data acquiring settings of the virtual sensor and the user terminal conflict with each other with respect to one physical sensor.

11. The electronic device according to claim 1, wherein the storage is configured to store information about a method where the sensor devices acquire data from an internal sensor module through a bus and to store information about a method where the sensor devices acquire data through the network.

12. A method, of an electronic apparatus, of controlling at least one sensor device connected through a network, the method comprising:
based on being connected with the at least one sensor device, the electronic device receiving information on data acquiring methods available for the at least one sensor device therefrom;
the electronic device storing the received information;
based on a request for setting a data acquiring method with respect to the at least one sensor device from a user terminal, the electronic device identifying whether the data acquiring method included in the request is suitable based on the stored information on the data acquiring methods, the user terminal being configured to acquire sensing data from the at least one sensor device through the electronic device;
based on the data acquiring method included in the request being suitable, the electronic device forwarding the identified data acquiring method to the at least one sensor device to set the at least one sensor device with reference to the forwarded data acquiring method; and
receiving the sensing data from the at least one sensor based on the forwarded data acquiring method.

13. The method according to claim 12, wherein the information on the data acquiring method comprises information on one or more of: a polling method, a batching method and a model-driven method.

14. The method according to claim 12, further comprising:
receiving and storing a data acquiring frequency associated with one or more of the polling method, the batching method and the model-driven method.

15. The method according to claim 14, wherein the data acquiring frequency is virtualized into numerals regardless of the kind of data acquiring methods.

16. The method according to claim 12, further comprising sending the user terminal a result of identifying whether the data acquiring method included in the request is suitable.

17. The method according to claim 12, further comprising updating information on the settings of a current data acquiring method based on the data acquiring method included in the request being suitable.

18. A non-transitory computer readable recording medium having stored thereon a program for implementing a method of an electronic device of controlling at least one sensor device connected thereto through a network, the method comprising:
based on being connected with the at least one sensor device, the electronic device receiving information on data acquiring methods available for the at least one sensor device therefrom;
the electronic device storing the received information;
based on a request for setting a data acquiring method with respect to the at least one sensor device from a user terminal, the electronic device identifying whether the data acquiring method included in the request is suitable based on the stored information on the data acquiring methods, the electronic device being configured to send sensing data to the user terminal so that the user terminal can acquire sensing data from the at least one sensor device through the electronic device;
based on the data acquiring method included in the request being suitable, the electronic device forwarding the identified data acquiring method to the at least one sensor device to set the at least one sensor device with reference to the forwarded data acquiring method; and
the electronic device receiving the sensing data from the at least one sensor based on the forwarded data acquiring method.

* * * * *